Patented Jan. 13, 1925.

1,523,289

UNITED STATES PATENT OFFICE.

HENRY L. RENARD, OF PHILADELPHIA, PENNSYLVANIA.

INSECTICIDE AND PROCESS OF PRODUCING THE SAME.

No Drawing.   Application filed May 10, 1923.   Serial No. 638,102.

*To all whom it may concern:*

Be it known that I, HENRY L. RENARD, a citizen of the United States, residing at Philadelphia, in the county of Philadelphia and State of Pennsylvania, have invented certain new and useful Improvements in Insecticides and Processes of Producing the Same, of which the following is a specification.

This invention relates to insecticides for use on flowering and garden plants and on fruit and other trees and has for its principal object to provide an insecticide for destroying all kinds of aphis, thrip, rose and chrysanthemum midge antirrhinium wilt, Japanese beetle and numerous other sucking and biting insects whose attacks have heretofore been difficult, if not impossible, to successfully combat.

In the practice of my invention I employ a liquid having in itself insecticidal properties, as a solvent for free nicotine, such liquid having the property of solidifying into a gummy mass upon being applied to vegetation and of slowly absorbing moisture from the plants and air whereby the nicotine is slowly given up or set free substantially in the form in which it was dissolved in the liquid.

As the liquid solvent for the nicotine I employ a solution and preferably an aqueous solution of sulfur and lime in the proportions of from about 19 to 24, and preferably about 20, parts by weight of sulfur to 6 to 10, and preferably about 8, parts by weight of the lime. If water is used to dissolve the lime sulfur mixture I prefer to use about 64 parts by weight of water to 28 parts by weight of the lime sulfur mixture. The proportion of water to the lime sulfur mixture is not of importance except from the standpoint of the desirability of producing a highly concentrated insecticide, providing sufficient water is employed to completely dissolve the lime sulfur mixture. To this solution free distilled nicotine is added in the proportion of from about 7 to 9 and preferably about 8 parts by weight of nicotine to 28 parts by weight of the lime sulfur mixture.

In producing my insecticide I prefer to mix the lime and sulfur in the proportions set forth and to this mixture I add sufficient water to slake the lime and dissolve the lime sulfur mixture. The solution of the mixture is facilitated by the heat developed upon the slaking of the lime. When the slaking of the lime is completed and the lime sulfur mixture has dissolved, the solution is allowed to cool and separated from any residue present by decantation or in any other suitable manner. To the clear separated solution the free nicotine is then added and the product is ready to be marketed.

In the use of my improved insecticide water is added in a proportion dependent upon the use to which the insecticide is to be put. Ordinarily the insecticide is diluted with from 40 to 50 parts by volume of water to one part of the insecticide and the diluted product is applied in any well known manner as by spraying it upon the plants, trees or the like to be treated therewith.

I have found that it is advantageous to use lime and sulfur of a high degree of purity and also that free nicotine and not merely tobacco juice or nicotine sulfate or other compound of nicotine must be employed, the tobacco juice and nicotine compounds not being capable of use to obtain the advantages of my invention.

While I prefer to employ water as the solvent for the lime sulfur mixture and the nicotine it will be understood that other solvents may be employed without departing from the present invention.

It is also to be understood that, while I have described the preferred proportions of the ingredients of my insecticide and the preferred manner of producing it, these proportions and the details of procedure in making the insecticide may be varied within the scope of the appended claims without departure from the spirit of my invention.

Having described my invention, I claim:

1. The herein described insecticide comprising sulfur, lime and free nicotine in the proportions of from about 19 to 24 parts by weight of sulfur, 6 to 10 parts by weight of lime, and 7 to 9 parts by weight of nicotine, dissolved in a suitable solvent.

2. The herein described insecticide comprising sulfur, lime and free nicotine in the proportions of from about 19 to 24 parts by weight of sulfur, 6 to 10 parts by weight of lime, and 7 to 9 parts by weight of nicotine, dissolved in water.

3. The herein described insecticide comprising about 20 parts by weight of sulfur, 8 parts by weight of lime, and 8 parts by weight of free nicotine dissolved in a suitable solvent.

4. The herein described insecticide comprising about 20 parts by weight of sulfur, 8 parts by weight of lime, and 8 parts by weight of free nicotine dissolved in water.

5. The herein described process of producing an insecticide comprising mixing sulfur and lime in the proportions of from about 19 to 24 parts by weight of sulfur to 6 to 10 parts by weight of lime, adding thereto a sufficient amount of water to slake the lime and dissolve the lime sulfur mixture and adding to the resulting solution free nicotine in the proportions of from about 7 to 9 parts by weight of nicotine to 28 parts by weight of the lime sulfur mixture.

In testimony whereof I affix my signature.

HENRY L. RENARD.